United States Patent [19]
Maes

[11] Patent Number: 6,088,669
[45] Date of Patent: *Jul. 11, 2000

[54] SPEECH RECOGNITION WITH ATTEMPTED SPEAKER RECOGNITION FOR SPEAKER MODEL PREFETCHING OR ALTERNATIVE SPEECH MODELING

[75] Inventor: Stephane Herman Maes, Danbury, Conn.

[73] Assignee: International Business Machines, Corporation, Armonk, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/787,029

[22] Filed: Jan. 28, 1997

Related U.S. Application Data

[60] Provisional application No. 60/011,058, Feb. 2, 1996.

[51] Int. Cl.[7] .............................. G10L 17/00; G10L 15/00
[52] U.S. Cl. ........................... 704/231; 704/246; 704/251
[58] Field of Search .................................... 704/231, 246, 704/251, 275

[56] References Cited

U.S. PATENT DOCUMENTS

| | | | |
|---|---|---|---|
| 4,757,525 | 7/1988 | Matthews et al. | 379/88.26 |
| 4,922,538 | 5/1990 | Tchorzewski | 704/247 |

OTHER PUBLICATIONS

D. A. Reynolds and L. P. Heck, "Integration of Speaker and Speech Recognition Systems," Proc. IEEE ICASSP 91, p. 869–872, Apr. 1991.

*Primary Examiner*—David R. Hudspeth
*Assistant Examiner*—Tālivaldis Ivars Šmits
*Attorney, Agent, or Firm*—Whitham, Curtis & Whitham; Paul J. Otterstedt, Esq.

[57] ABSTRACT

Speaker recognition is attempted on input speech signals concurrently with provision of input speech signals to a speech recognition system. If a speaker is recognized, a speaker dependent model which has been trained on an enrolled speaker is supplied to the speech recognition system. If not recognized, then a speaker-independent recognition model is used or, alternatively, the new speaker is enrolled. Other speaker specific information such as a special language model, grammar, vocabulary, a dictionary, a list of names, a language and speaker dependent preferences can also be provided to improve the speech recognition function or even configure or customize the speech recognition system or the response of any system such as a computer or network controlled in response thereto. A consistency check in the form of a decision tree is preferably provided to accelerate the speaker recognition process and increase the accuracy thereof. Further training of a model and/or enrollment of additional speakers may be initiated upon completion of speaker recognition and/or adaptively upon each speaker utterance.

30 Claims, 2 Drawing Sheets

SPEECH RECOGNITION WITH ATTEMPTED SPEAKER RECOGNITION FOR SPEAKER MODEL PREFETCHING OR ALTERNATIVE SPEECH MODELING

CROSS-REFERENCE TO RELATED APPLICATIONS

This application is a continuation-in-part of a provisional U.S. Patent Application S. No. 60/011,058, entitled Speaker Identification System, filed Feb. 2, 1996, priority of which is hereby claimed under 35 U.S.C. §119(e)(1) and which is hereby fully incorporated by reference.

BACKGROUND OF THE INVENTION

1. Field of the Invention

The present invention generally relates to speech and speaker recognition systems and, more particularly, to speech recognition systems including signal processing model substitution.

2. Description of the Prior Art

Many electronic devices require input from a user in order to convey to the device particular information required to determine or perform a desired function or, in a trivially simple case, when a desired function is to be performed as would be indicated by, for example, activation of an on/off switch. When multiple different inputs are possible, a keyboard comprising an array of two or more switches has been the input device of choice in recent years.

However, keyboards of any type have inherent disadvantages. Most evidently, keyboards include a plurality of distributed actuable areas, each generally including moving parts subject to wear and damage and which must be sized to be actuated by a portion of the body unless a stylus or other separate mechanical expedient is employed. Accordingly, in many types of devices, such as input panels for security systems and electronic calculators, the size of the device is often determined by the dimensions of the keypad rather than the electronic contents of the housing. Additionally, numerous keystrokes may be required (e.g. to specify an operation, enter a security code, personal identification number (PIN), etc.) which slows operation and increases the possibility that erroneous actuation may occur. Therefore, use of a keyboard or other manually manipulated input structure requires action which is not optimally natural or expeditious for the user.

In an effort to provide a more naturally usable, convenient and rapid interface and to increase the capabilities thereof, numerous approaches to voice or sound detection and recognition systems have been proposed and implemented with some degree of success. However, variations in acoustic signals, even from a single speaker, which may represent a command present substantial signal processing difficulties and present the possibility of errors or ambiguity of command understanding by the system which may only be partially avoided by substantial increase of processing complexity and increase of response time.

For example, a simple voice actuated system which relies on template matching of the acoustical content of an utterance theoretically requires a particular word or phrase to be input for each command which can be used by each enrolled (e.g. authorized) user. Therefore, even a moderate number of recognizable commands for each of a moderate number of users can require comparison with a very large number of templates while not guaranteeing successful or accurate voice recognition due to variation of the acoustical signal each time a command may be uttered. Conversely, a speaker independent system would only require enrollment of commands to be recognized and a correspondingly reduced number of template comparisons but accuracy of command recognition or understanding by the system would be severely compromised by additional variation of acoustical signals from speaker to speaker.

Accordingly, it can be understood that while improved performance can be expected from a speaker dependent system, such improved performance has heretofore only been achieved at the expense of greater processing complexity and consequent degradation of response time and increased hardware and/or software overhead.

SUMMARY OF THE INVENTION

It is therefore an object of the present invention to provide a system and method for speaker identification and corresponding prefetching of a speaker dependent model to improve voice recognition performance while reducing signal processing overhead.

It is another object of the invention to rapidly provide speaker dependent information to a voice recognition system or navigator requiring minimal computation complexity, processing or hardware overhead and data storage.

In order to accomplish these and other objects of the invention, a method of operating a speech recognition system and apparatus including a speech recognition system is provided including arrangements for performing the steps of identifying a speaker by comparing an input speech signal with a stored representation of speech signals corresponding to a speaker, providing a speech processing model to the speech recognition system in accordance with results of the identifying step, and processing the speech signal with the speech processing model provided to the speech recognition system.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
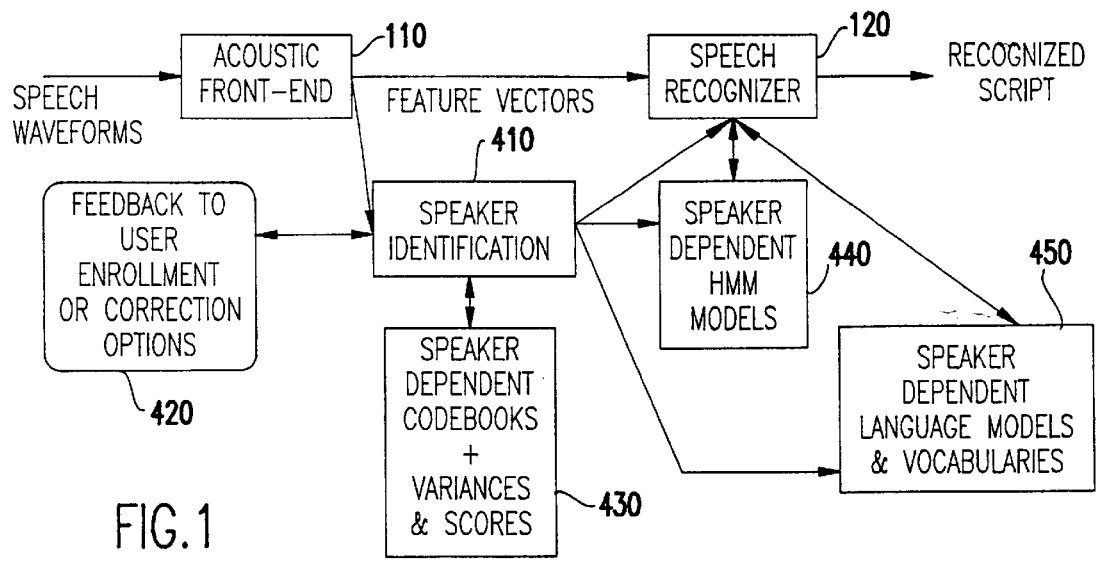
FIG. 1 is a high-level block diagram/flow chart illustrating the overall organization of the invention in a speech recognition system.

Referring now to the drawings, and more particularly to FIG. 1, there is shown a flow chart illustrating the methodology of a speech recognition system with which the present invention is preferably used. It should be understood that the depiction of the invention in FIG. 1 (and FIGS. 2–3, as well) could be considered as being a high-level block diagram of apparatus 100 for carrying out the invention. In this latter regard, it should be further understood that while the invention is preferably carried out utilizing a suitably programmed general purpose digital computer, the functional elements depicted in the drawings are exemplary of functional elements which would be established within the computer by such programming. The Figures thus also illustrate a suitable and preferred processor architecture for practicing the invention which may be achieved by programming of a general purpose processor.

Figure 2:
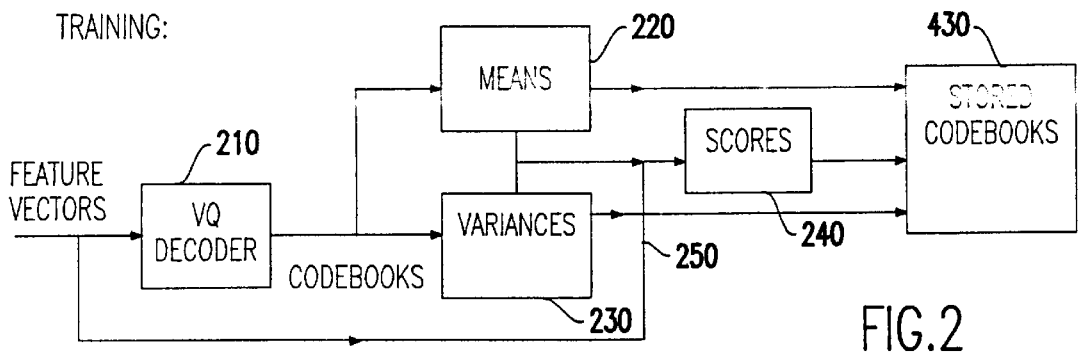
FIG. 2 is a high-level block diagram/flow chart illustrating training of a speaker recognition model in accordance with the invention.
Figure 3:
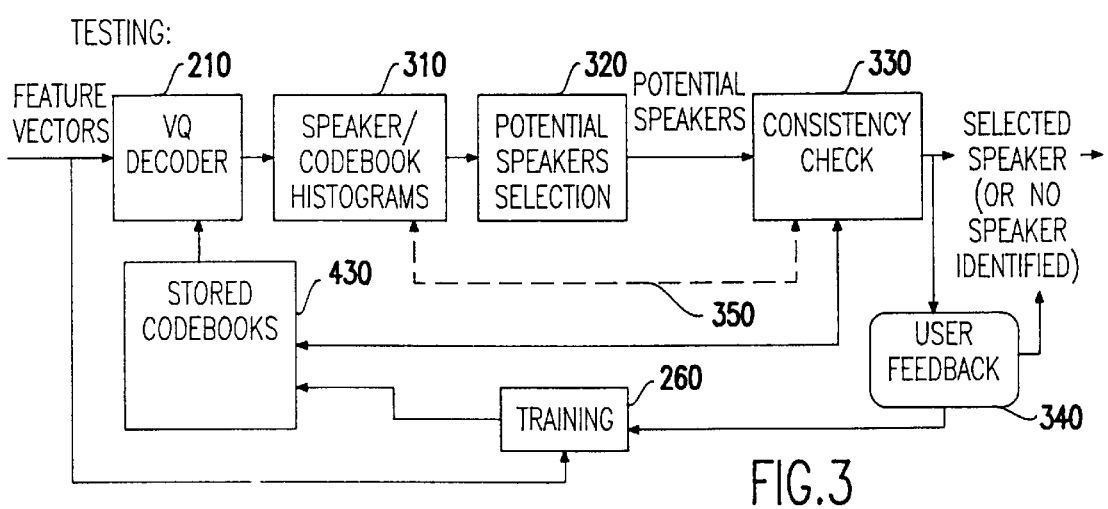
FIG. 3 is a high-level block diagram/flow chart illustrating speaker recognition and model selection as well as preferred additional functions of the invention.

Of course, a special purpose processor configured in the manner depicted in FIGS. 1–3 would be expected to achieve somewhat enhanced performance levels in comparison with a general purpose processor. Nevertheless, a general purpose processor is presently preferred in view of the flexibility which may be provided for inclusion of other processing as may be desired.

It should also be clearly understood that while the preferred form of speaker recognition will be described below in connection with FIG. 1, the practice of the invention and realization of the basic meritorious effects thereof does not rely on any particular form of speaker recognition or speech recognition. For example, to provide speaker recognition, template matching against a single template of an utterance used to invoke the system for each enrolled user could achieve speaker recognition and the speaker identification thus achieved could then be used for practice of the remainder of the methodology of the invention. However, such a variant of the preferred methodology would cause the speaker recognition to be text-dependent, at least to the limited extent of the chosen utterance for each user, and would preclude other perfecting features of the invention such as adaptive modification of the speaker recognition process.

The preferred, text independent form of speaker recognition system in accordance with the invention preferably utilizes feature vectors developed by an acoustic front end 110. Such feature vectors are preferably computed on overlapping 30 msec. frames with shifts of 10 msec. Physiologically related MEL cepstra, delta and delta-delta feature vectors are preferred as feature vectors for efficiency and effectiveness of speaker identification or verification although other known types of feature vectors could be used. Such feature vectors and others, such as LPC cepstra, are thirty-nine dimension vectors, as is well-understood in the art.

In any case, the development of such feature vectors from an input signal is purely a function of the speech recognizer 120 and need not be separately provided for speaker recognition in accordance with the present invention. By the same token, the particulars of speech recognizer 120 are not critical to the practice of the invention. It is, however, convenient and preferred for speaker recognition to utilize feature vectors which are otherwise available although feature vectors may also be separately derived in the practice of the present invention. A minimum of information specific to the voice of an enrolled speaker is accumulated and stored in codebooks 430 in the form of a set of about sixty-five clustered feature vectors and variances which are captured under control of the speaker recognition processor 410 as each new speaker is enrolled, as will be discussed in detail below with reference to FIG. 2. As the user is recognized, feedback of the recognition is provided to a user through any convenient device such as a display, indicator, annunciator or printer, as indicated at 420. At the same time, the speaker can enroll specific commands, preferences and other speaker-specific information to be uniquely associated with the speaker. Such commands, preferences and information are referred to herein as aliases since they are specialized forms of commands (e.g. procedural short-cuts or macros specific to an individual user) available on the system or which the system can otherwise accommodate but are uniquely modified for use by the identified speaker in accordance with the speaker identified. When an enrolled speaker uses the system, the acoustic features of any utterance are computed and simultaneously provided to the speaker identification system 410 of the present invention and the speech recognizer 120. Referring briefly to FIG. 3, as well, the speaker identification phase during use of the invention is preferably implemented with a vector quantizer decoder. On a frame-by-frame basis, the vector quantizer decoder included in speaker identification processor 410 identifies the closest codebook or ranks the closest codebooks by comparison of the feature vector computed from the frame with the mean values, variances and scores 430 of the clusters of feature vectors which comprise codewords of each codebook. Each feature vector is scored against feature vectors forming the codebooks based on the vector parameters and variances in the codebooks and the scores are accumulated for each codebook. The specific scoring technique is not critical to the practice of the invention but should be based on the distance of each dimension of each feature vector from a corresponding dimension of each vector in each codebook.

Such accumulation of scores during use of the system provides a degree of adaptive modification of the codebooks as the system is used in order to more fully accommodate variation of the signal produced by utterances of each enrolled speaker. The stored means and variances stored in the codebooks can be adaptively altered in much the same manner during use of the system to improve system performance.

A histogram is thus developed at element 310 which counts or accumulates how many frames have selected each codebook; the codebook most often selected identifying the potential speaker, as indicated at 320 of FIG. 3. By the same token, the average distance of the vector parameters from the closest codebook allows detection (e.g. based on an empirically or adaptively derived threshold) of new speakers and, if desired, the user may then be prompted with an enrollment menu and a further codebook developed.

Once a speaker is identified, as described above, speaker identification element 410 can control the loading of a speaker dependent model, in any form such as the well-understood Hidden Markov Model (HMM), special language models, grammar, vocabularies, dictionaries, lists of names, languages or the like which are specific to the identified user for the speech recognition element 120 of the system. Such speaker specific models (which may be adaptively trained in a well-understood manner) and other information is thus made available to improve accuracy of speech recognition. Further, loading of such speaker dependent information serves to limit the data against which the utterance must be matched or compared to reduce processing overhead and response time. If no enrolled speaker is identified, a generic, speaker independent set of models is loaded as a default.

If desired, some of the speaker dependent information, such as special vocabularies and language models, and other information such as speaker dependent preferences (e.g. in the form of files, system configuration information and the like) can be stored in and retrieved from a database 450 for communication to the speech recognizer 120 in accordance with the recognized speaker. Such information could be accessed in accordance with both a speaker identity and a recognized command. Thus, for example, while this description of the invention assumes that security and access control are not an issue, the system in accordance with the invention can clearly include such features, such as limiting access of a child to games. Conversely, from the point of view of such a user, speaker recognition could be used to configure the system to present games to such a user without other user input to the system. Use of such a database can also provide additional efficiency of storage when some information, such as language, is common to plural enrolled users.

Referring now to FIG. 2, a training phase (also referred to as enrollment) of the speaker identification system in accordance with the invention will now be described. During enrollment, feature vectors corresponding to sampled frames of arbitrary utterances are computed by the vector quantizer 210 included in the speaker identification processor 410 of FIG. 1. These feature vectors are then clustered into about sixty-five codewords, each codeword being built from the most closely corresponding feature vectors and characterized by the mean and variances of each cluster of feature vector parameters, computed at 220 and 230, respectively. The groups of codewords are stored as codebooks 430. The number of codewords in a codebook is not at all critical to the practice of the invention but groups of codewords numbering about sixty-five is computationally convenient while representing a sufficient variety of speaker utterances for acceptably consistent and accurate speaker identification.

Additionally, scores for each codeword are computed at element 240 to reflect the number of feature vectors (input thereto over data path 250) which are stored for each codeword while being relatively far apart (e.g. along a Mahalanobis distance which is a weighted Euclidian distance in which weights are assigned according to the inverse of the variances of each of the dimensions or parameters of the feature vector, or a probabilistic distance where the distance is the log-likelihood of the Gaussian function associated to the codeword, having the same mean and variance as the corresponding feature vector parameter). The weights assigned using a Mahalanobis distance can be decided a-priori based on the data used to train the speech recognition application or "on-the-fly" based on either the training data or testing data or both. Thus both the accumulation and storage of scores as well as the computation and/or periodic recomputation of means and variances provides adaptive training during enrollment of a speaker as well as adaptive improvement of codebooks during use.

Referring now to FIG. 3, the operation of the preferred embodiment of the invention during use of the system will be further described. Use of the system is also referred to as a testing phase of operation to distinguish it from the training/enrollment phase (although further adaptive training can occur during system use which the term is also considered to reflect) and because feature vectors computed from signals representing utterances of a speaker are tested against information stored in the codebooks 430 depicted in both FIGS. 2 and 3. It should also be noted in FIG. 3 that the remainder of FIG. 2 (e.g. elements 210, 220, 230 and 240 and their connections) is depicted as training element 260.

Depending on the application and the delay in speaker identification which may be tolerable, the speech recognition system 120 (FIG. 1) may start operation in a speaker independent mode. Alternatively, if a few seconds of delay are tolerable, operation of the speech recognition may be suppressed until a speaker has been at least tentatively identified. Generally, in the practice of the invention, a peak of the histogram or other significant divergence of selected codebook counts will be developed after about three seconds of speech, allowing a speaker dependent model 440 to be implemented in the speech recognizer 120. If no tentative decision as to the potentially identified speaker is made by that point, a speaker independent model may be implemented. A final decision of speaker identity (or a final determination that no enrolled speaker can be identified) can generally be made at a high confidence level after five to ten seconds. It is preferred, but not necessary that the speaker identity determination be provided to the user (e.g. by display, annunciator, etc., possibly as a greeting message) as feedback 340 to allow correction of the selection or retraining or further training 260 of the codebook by capture of further, current frames and computation of corresponding feature vectors. Using substantially the same process, if no speaker has been identified, the user may be provided the option of enrolling or initiating the enrollment or training process 260 as described above with reference to FIG. 2, preferably by presentation of an enrollment menu.

Figure 4:
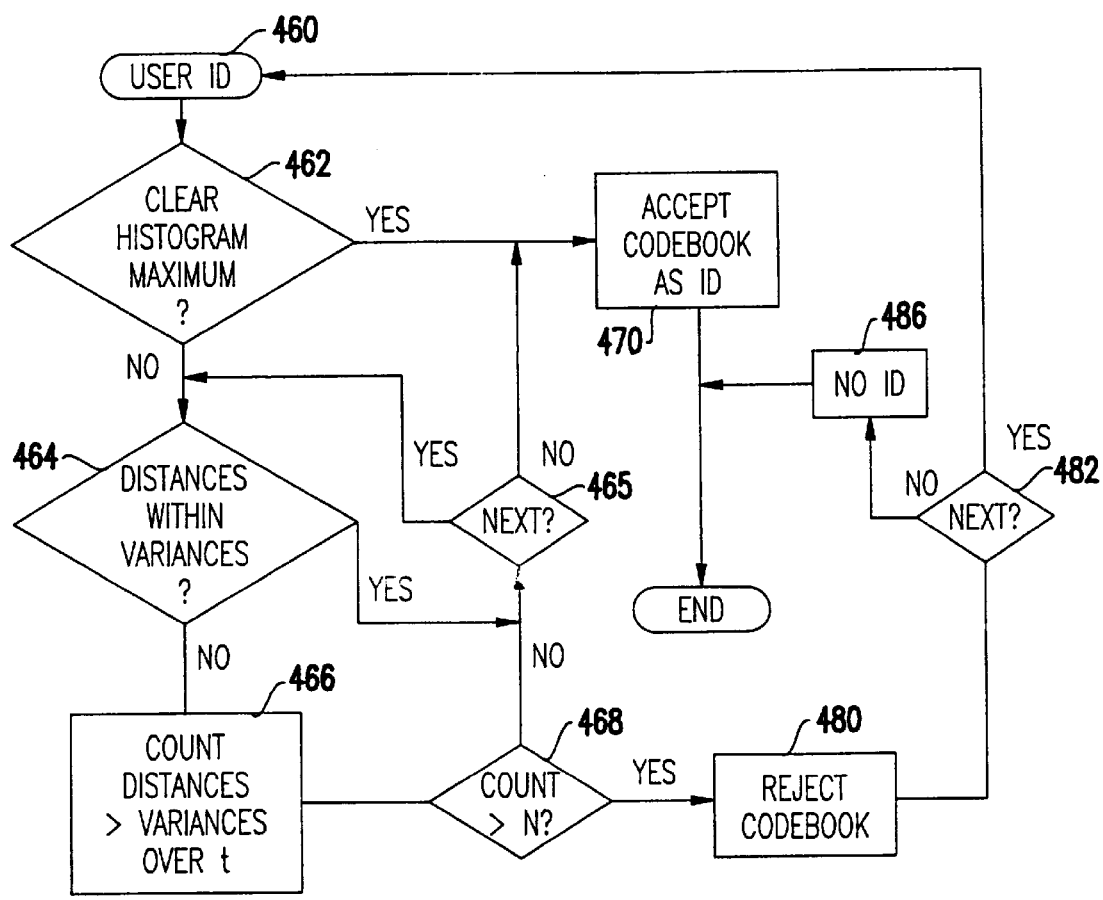
FIG. 4 is a flow chart illustrating a preferred decision tree utilized in consistency checks in accordance with the present invention.

It is preferred and considered to be an important aspect of the present invention to follow the determination of a potential speaker identification with a consistency check, as indicated at 330 of FIG. 3. The consistency check includes one or more tests of the potential speaker identity and the speaker recognition process which are preferably implemented with decision trees; a preferred form of which is illustrated in FIG. 4. Since decision trees can provide for the tests to be carried out in rapid sequence and tests which are irrelevant in view of other, preceding tests to be omitted, a consistency check, particularly if so implemented, greatly accelerates the speaker recognition process and allows an appropriate signal processing model to be implemented in the speech recognizer 210 with minimum delay.

As shown in FIG. 4, a preferred decision tree implementing a preferred form of consistency check begins when a potential speaker identity is determined at 320 of FIG. 3, typically after about three to five seconds of speech as depicted at 460 of FIG. 4. As a first test, the histogram or feature vector count corresponding to each codebook count is examined as depicted by dashed arrow 350 of FIG. 3 to determine if a clear maximum is presented by the histogram or count. The decision threshold for such a test (depicted at 462 of FIG. 4) is preferably determined empirically but is not particularly critical to the practice of the invention. A clear maximum would be found if the count for a particular codebook exceeded all others by some factor (e.g. two, as a working threshold value).

If a clear maximum is found, the comparison of the feature vectors with a specific codebook is considered sufficiently consistent for speaker recognition that no further tests need be carried out and the codebook is accepted as corresponding to the speaker by branching to 470 and the consistency check is complete. As depicted in FIG. 3, the process in accordance with the invention may then be preferably continued by provision of the identification to the user for correction or further codebook training or retraining, if necessary or desired.

If a clear maximum is not found, either two or more potential identities/codebooks are competing for recognition (or, possibly, two or more speakers are providing inputs to the system and which can be accommodated in accordance with arrangements disclosed in concurrently filed U.S. patent application Ser. No. 08/788,471 (Attorney's Docket No. YO9-96-188) assigned to the assignee of the present invention and fully incorporated by reference herein) and distances of parameters of computed feature vectors from corresponding mean values of codewords becomes more critical. As shown at 464 of FIG. 4, if all distances of parameters of feature vectors are within the variances contained in the codebook (or within some multiple or factor thereof, as may be empirically determined), the feature vector corresponding to a particular frame is considered to be sufficiently consistent with a codeword and the next feature vector, if any (as determined at 465), is similarly examined. Any feature vectors which do no present distances within the variances (or factors or multiples thereof) are counted at 466 and the count compared with an empirically determined number at 468.

It should be noted that only the feature vectors which caused a competing codebook to be selected need be considered and it is preferred that the comparison and counting process be carried out in descending order of the magnitude of counts or histogram peaks carried out at 310 of FIG. 3. Further, the rate at which the distances are found to exceed the variances is the quantity of interest and it is therefore preferred that the feature vectors be examined in frame order over a consistent number of frames (corresponding to a consistent time interval, t).

Whenever the count 466 exceeds N, the stored rate obtained during enrollment is rejected at 480 and the next potential speaker in order of count or histogram peak magnitude, if any (as determined at 482), is examined by looping to 460. When no further potential speaker identities remain to be examined and if all examined potential speaker identities have caused branching to 480 at 468, all competing, potential codebooks will have been rejected. Accordingly, it is reported that no speaker has been identified at 486, the consistency check ends and appropriate action including a speaker independent model being loaded to the speech recognition system and, if desired, further enrollment or codebook training may be initiated. If, on the other hand, the feature vectors corresponding to the examined interval, t, are exhausted before a count of N is reached (or exceeded) at 468, the feature vectors are considered to be sufficiently consistent with a codebook for the corresponding speaker identification to be accepted by branching to 470 at 465.

In view of the foregoing, it is seen that the arrangement in accordance with the invention provides for extremely rapid and efficient speaker recognition to allow rapid loading of a speaker dependent model to improve performance of a speech recognition system with which the invention may be used. It should be noted in this regard that the comparison of feature vectors with statistical summaries of previously captured feature vectors clustered as codewords allows effectively simultaneous comparison with a potentially large plurality of such previously captured feature vectors as well as minimization of storage requirements while allowing limitation of the size of codebooks and the number of comparisons which must be made. The speaker dependent model can thus be prefetched and implemented in the speech recognition system before speech recognition is performed even when only a delay of a few seconds is tolerable in an application. Even when no delay is tolerable, the invention provides for use of a speech independent model until recognition is achieved or it is determined that recognition is not possible within the high level of certainty provided by a rapidly executed consistency check which can accelerate the recognition process. Thus, if speech recognition using a speaker independent model is not successful, a speaker dependent model yielding improved performance can be quickly substituted to resolve ambiguity or incorrect understanding of improperly recognized speech generally within a time comparable to the reaction time of a user to a report thereof.

While the invention has been described in terms of a single preferred embodiment, those skilled in the art will recognize that the invention can be practiced with modification within the spirit and scope of the appended claims.

Having thus described my invention, what I claim as new and desire to secure by Letters Patent is as follows:

1. A method of operating a speech recognition system, said method comprising the steps of:

identifying a speaker by text-independent comparison of an input speech signal with a stored representation of speech signals corresponding to one of a plurality of speakers, said input speech signal including a plurality of words, providing a speech processing model to said speech recognition system in accordance with results of said identifying step, and recognizing said plurality of words within said input speech signal with said speech processing model, said stored representation of speech signals and said speech processing model being loaded into said system only once for recognition of said speaker and said plurality of words in said input speech signal so that said system performs continues speech recognition for said plurality of words, wherein said method includes the further step of:

processing said speech signal in accordance with a speaker independent model during but prior to completion of said identifying step.

2. A method of operating a speech recognition system, said method comprising the steps of:

identifying a speaker by text-independent comparison of an input speech signal with a stored representation of speech signals corresponding to one of a plurality of speakers, said input speech signal including a plurality of words, providing a speech processing model to said speech recognition system in accordance with results of said identifying step, and recognizing said plurality of words within said input speech signal with said speech processing model, said stored representation of speech signals and said speech processing model being loaded into said system only once for recognition of said speaker and said plurality of words in said input speech signal so that said system performs continuous speech recognition for said plurality of words, wherein the method includes the further step of:

processing said speech signal in accordance with a speaker independent model subsequent to completion of said identifying step when said identifying step does not identify an enrolled speaker.

3. A method of operating a speech recognition system, said method comprising the steps of:

identifying a speaker by text-independent comparison of an input speech signal with a stored representation of speech signals corresponding to one of a plurality of speakers, said input speech signal including a plurality of words, providing a speech processing model to said speech recognition system in accordance with results of said identifying step, and recognizing said plurality of words within said input speech signal with said speech processing model, said stored representation of speech signals and said speech processing model being loaded into said system only once for recognition of said speaker and said plurality of words in said input speech signal so that said system performs continues speech recognition for said plurality of words, wherein said stored representation of speech signals includes a plurality of codebooks, each codebook including a plurality of codewords comprising mean and variance values of parameters of clusters of feature vectors computed from frame of speech signals corresponding to an enrolled speaker, wherein said identifying step includes the step of:

sampling frames of said input speech signal;

computing feature vectors from frames of said input speech signal;

comparing parameters of ones of said feature vectors computed in said computing step with said stored mean and variance values to derive a score; and counting the number of feature vectors which correspond to each said codebook in accordance with results of said step of comparing parameters, wherein the method further includes:

performing a consistency check of results of said identifying step; and processing said speech signal in accordance with a speaker independent model subsequent to completion of said identifying step when said identifying step does not identify an enrolled speaker.

4. A method of operating a speech recognition system, said method comprising the steps of:

identifying a speaker by text-independent comparison of an input speech signal with a stored representation of speech signals corresponding to one of a plurality of speakers, said input speech signal including a plurality of words, providing a speech processing model to said speech recognition system in accordance with results of said identifying step, and recognizing said plurality of words within said input speech signal with said speech processing model, said stored representation of speech signals and said speech processing model being loaded into said system only once for recognition of said speaker and said plurality of words in said input speech signal so that said system performs continues speech recognition for said plurality of words, wherein said speech processing model corresponds to one of a special language model, grammar, vocabulary, a dictionary, a list of names, a language and speaker dependent preferences which does not correspond to said stored representation of speech signals used for performing said text-independent comparison in said identifying step.

5. A method of operating a speech recognition system, said method comprising the steps of:

identifying a speaker by text-independent comparison of an input speech signal with a stored representation of speech signals corresponding to one of a plurality of speakers, said input speech signal including a plurality of words, providing a speech processing model to said speech recognition system in accordance with results of said identifying step, and recognizing said plurality of words within said input speech signal with said speech processing model, said stored representation of speech signals and said speech processing model being loaded into said system only once for recognition of said speaker and said plurality of words in said input speech signal so that said system performs continues speech recognition for said plurality of words, determining whether to perform speech recognition in one of a speaker-independent mode or a speaker-dependent mode; and selecting said speech processing model to be a speaker-dependent model or a speaker-independent model based on said determining step.

6. A method as recited in claim 5, wherein said stored representation of speech signals includes a plurality of codebooks, each codebook including a plurality of codewords comprising mean and variance values of parameters of clusters of feature vectors computed from frames of speech signals corresponding to an enrolled speaker, wherein said identifying step includes the steps of sampling frames of said input speech signal, computing feature vectors from frames of said input speech signal, comparing parameters of ones of said feature vectors computed in said computing step with said stored mean and variance values to derive a score, and counting the number of feature vectors which correspond to each said codebook in accordance with results of said step of comparing parameters.

7. A method as recited in claim 6, including the further step of performing a consistency check of results of said identifying step.

8. A method as recited in claim 7, including the further step of comparing results of said counting step.

9. A method as recited in claim 8, including the further step of determining whether or not a distance of a parameter of a feature vector from a mean value of a parameter of a codeword is greater than a distance corresponding to a variance of a corresponding parameter of said codeword for each of a plurality of feature vectors, and detecting a rate of occurrence of a result of said determining step.

10. A method as recited in claim 7, including the further step of determining whether or not a distance of a parameter of a feature vector from a mean value of a parameter of a codeword is greater than a distance corresponding to a variance of a corresponding parameter of said codeword for each of a plurality of feature vectors, and detecting a rate of occurrence of a result of said determining step.

11. A method as recited in claim 4, including the further step of providing results of said identifying step to said speaker.

12. A method as recited in claim 11, including the further step of initiating a process for creating or training a codebook in response to said step of providing results of said identifying step to said user.

13. A method as recited in claim 7, wherein identifying step includes identifying said speaker based on codebooks each formed from a set of clustered feature vectors corresponding to a respective one of said plurality of speakers, said stored representation of speech signals including one of said codebooks, and wherein said consistency check includes:

determining whether a feature vector count for one of said codebooks corresponding to the speaker identified in said identifying step meets predetermined criteria; and verifying the speaker identified in said identifying step if said feature vector count meets said predetermined criteria, and further analyzing said codebooks to determine a correct speaker if said feature vector count does not meet said predetermined criteria.

14. A method as recited in claim 5, wherein said identifying step includes a template matching process.

15. A method as recited in claim 5, including the further step of processing said speech signal in accordance with a speaker dependent model subsequent to completion of said identifying step.

16. A method as recited in claim 5, including the further step of providing results of said identifying step to said speaker.

17. A method as recited in claim 16, including the further step of initiating a process for creating or training a codebook in response to said step of providing results of said identifying step to said user.

18. A method as recited in claim 5, wherein said speech processing model is a speaker-dependent model, and wherein said method further comprises:

providing a speaker-independent model; and recognizing said plurality of words within said input speech signal using said speaker-independent model if said speaker is not identified within a predetermined period of time after initiation of said identifying step or if said words in said input speech signal cannot be recognized using said speaker-dependent model.

19. A method as recited in claim 5, repeating said speaker identifying step when a new speaker is expected, and if new, loading a new stored representation of speech signals corresponding to said new speaker.

20. A method of operating a speech recognition system, said method comprising the steps of:

identifying a speaker by text-independent comparison of an input speech signal with a stored representation of speech signals corresponding to one of a plurality of speakers, said input speech signal including a plurality of words, providing a speech processing model to said speech recognition system in accordance with results of said identifying step, and recognizing said plurality of words within said input speech signal with said speech processing model, said stored representation of speech signals and said speech processing model being loaded into said system only once for recognition of said speaker and said plurality of words in said input speech signal so that said system performs continues speech recognition for said plurality of words, wherein if no speaker is identified in said identifying step, performing a step of presenting an enrollment menu for enrolling said speaker.

21. A method of operating a speech recognition system, said method comprising the steps of:

identifying a speaker by text-independent comparison of an input speech signal with a stored representation of speech signals corresponding to one of a plurality of speakers, said input speech signal including a plurality of words, providing a speech processing model to said speech recognition system in accordance with results of said identifying step, and recognizing said plurality of words within said input speech signal with said speech processing model, said stored representation of speech signals and said speech processing model being loaded into said system only once for recognition of said speaker and said plurality of words in said input speech signal so that said system performs continues speech recognition for said plurality of words, wherein said stored representation of speech signals includes a codebook formed from a set of clustered feature vectors corresponding to said speaker, and wherein said speech processing model is a speaker-dependent model formed from information different from information used to form said codebooks.

22. A method of operating a speech recognition system, said method comprising the steps of:

identifying a speaker by text-independent comparison of an input speech signal with a stored representation of speech signals corresponding to one of a plurality of speakers, said input speech signal including a plurality of words, providing a speech processing model to said speech recognition system in accordance with results of said identifying step, recognizing said plurality of words within said input speech signal with said speech processing model, said stored representation of speech signals and said speech processing model being loaded into said system only once for recognition of said speaker and said plurality of words in said input speech signal so that said system performs continues speech recognition for said plurality of words; and using a speaker-independent model for recognizing said plurality of words in said input speech signal when an enrolled speaker is not identified in said identifying step.

23. An apparatus for performing speech recognition comprising:

means for identifying a speaker by text-independent comparison of an input speech signal with a stored representation of speech signals corresponding to one of a plurality of speakers, said input speech signal including a plurality of words;

means for providing a speech processing model to said speech recognition system in response to said means for identifying a speaker; and means for recognizing said plurality of words within said input speech signal with said speech processing model, said stored representations of speech signals and said speech processing model being loaded only once for recognition of said speaker and said words in said input speech signal so that said system performs continues speech recognition;

wherein said apparatus further includes:

means for determining whether to perform speech recognition in one of a speaker-independent mode or a speaker-dependent mode; and means for selecting said speech processing model to be a speaker-dependent model or a speaker-independent model based on said determining step.

24. Apparatus as recited in claim 23, wherein said stored representation of speech signals includes a plurality of codebooks, each codebook including a plurality of codewords comprising mean and variance values of parameters of clusters of feature vectors computed from frames of speech signals corresponding to an enrolled speaker and wherein said identifying means includes means for sampling frames of said input speech signal, means for computing feature vectors from frames of said input speech signal, means for comparing parameters of ones of said feature vectors with said stored mean and variance values to derive a score, and counting the number of feature vectors which correspond to each said codebook in response to said means for comparing parameters.

25. Apparatus as recited in claim 24, further including means for performing a consistency check of results provided by said means for identifying a speaker.

26. Apparatus as recited in claim 25, further including means for determining whether or not a distance of a parameter of a feature vector from a mean value of a parameter of a codeword is greater than a distance corresponding to a variance of a corresponding parameter of said codeword for each of a plurality of feature vectors, and means for detecting a rate of occurrence of a result provided by said means for determining.

27. An apparatus as recited in claim 23, wherein said speech processing model is a speaker-dependent model, and wherein said apparatus further includes:

means for providing a speaker-independent model if said speaker is not identified within a predetermined period of time after initiation of said identifying step or if said recognizing means cannot recognize said words in said input speech signal using said speaker-dependent model, and wherein said recognizing means recognizes said words within said input speech signal based on said speaker-independent model.

28. An apparatus for performing speech recognition comprising:

means for identifying a speaker by text-independent comparison of an input speech signal with a stored representation of speech signals corresponding to one of a plurality of speakers, said input speech signal including a plurality of words;

means for providing a speech processing model to said speech recognition system in response to said means for identifying a speaker; and means for recognizing said plurality of words within said input speech signal with said speech processing model, said stored representations of speech signals and said speech processing model being loaded only once for recognition of said speaker and said words in said input speech signal so that said system performs continues speech recognition;

wherein said apparatus further includes:

means for presenting an enrollment menu for enrolling said speaker if said identifying means is unable to identify said speaker.

29. An apparatus for performing speech recognition comprising:

means for identifying a speaker by text-independent comparison of an input speech signal with a stored representation of speech signals corresponding to one of a plurality of speakers, said input speech signal including a plurality of words;

means for providing a speech processing model to said speech recognition system in response to said means for identifying a speaker; and means for recognizing said plurality of words within said input speech signal with said speech processing model, said stored representations of speech signals and said speech processing model being loaded only once for recognition of said speaker and said words in said input speech signal so that said system performs continuous speech recognition;

wherein said identifying means identifies said speaker based on a text-independent model containing codebooks each formed from a set of clustered feature vectors corresponding to a respective one of said plurality of speakers, said stored representation of speech signals containing one of said codebooks, and wherein said speech processing model is a speaker-dependent model formed from information different from information used to form said codebooks.

30. An apparatus for performing speech recognition comprising:

means for identifying a speaker by text-independent comparison of an input speech signal with a stored representation of speech signals corresponding to one of a plurality of speakers, said input speech signal including a plurality of words;

means for providing a speech processing model to said speech recognition system in response to said means for identifying a speaker; and means for recognizing said plurality of words within said input speech signal with said speech processing model, said stored representations of speech signals and said speech processing model being loaded only once for recognition of said speaker and said words in said input speech signal so that said system performs continues speech recognition, wherein said stored representation of speech signals includes a plurality of codebooks, each codebook including a plurality of codewords comprising mean and variance values of parameters of clusters of feature vectors computed from frames of speech signals corresponding to an enrolled speaker and wherein said identifying means includes:

means for sampling frames of said input speech signal;

means for computing feature vectors from frames of said input speech signal;

means for comparing parameters of ones of said feature vectors with said stored mean and variance values to derive a score; and means for counting the number of feature vectors which correspond to each said codebook in response to said means for comparing parameters, wherein said apparatus further includes:

means for performing a consistency check of results provided by said means for identifying a speaker, wherein said identifying means identifies said speaker based on a text-independent model containing codebooks each formed from a set of clustered feature vectors corresponding to a respective one of said plurality of speakers, said stored representation of speech signals containing one of said codebooks, and wherein said means for performing a consistency check:

determines whether a feature vector count for one of said codebooks corresponding to the speaker identified by said identifying means meets predetermined criteria; and verifies the speaker identified by said identifying means if said feature vector count meets said predetermined criteria, and further analyzes said codebooks to determine a correct speaker if said feature vector count does not meet said predetermined criteria.

* * * * *

UNITED STATES PATENT AND TRADEMARK OFFICE
CERTIFICATE OF CORRECTION

PATENT NO. : 6,088,669
DATED : July 11, 2000
INVENTOR(S) : Stephane H. Maes

It is certified that error appears in the above-identified patent and that said Letters Patent is hereby corrected as shown below:

Column 8,
Lines 21 and 66, change "continues" to read -- continuous --;

Column 9,
Lines 40 and 66, change "continues" to read -- continuous --;

Column 12,
Lines 7, 31, and 52, change "continues" to read -- continuous --;

Column 13,
Line 49, change "continues" to read -- continuous --;

Column 14,
Line 29, change "continues" to read -- continuous --;

Signed and Sealed this

Twenty-fifth Day of December, 2001

*Attest:*

JAMES E. ROGAN
*Attesting Officer*   *Director of the United States Patent and Trademark Office*